Nov. 14, 1944.  A. H. JAHNS  2,362,557
PIPE CONNECTION
Filed Feb. 1, 1943
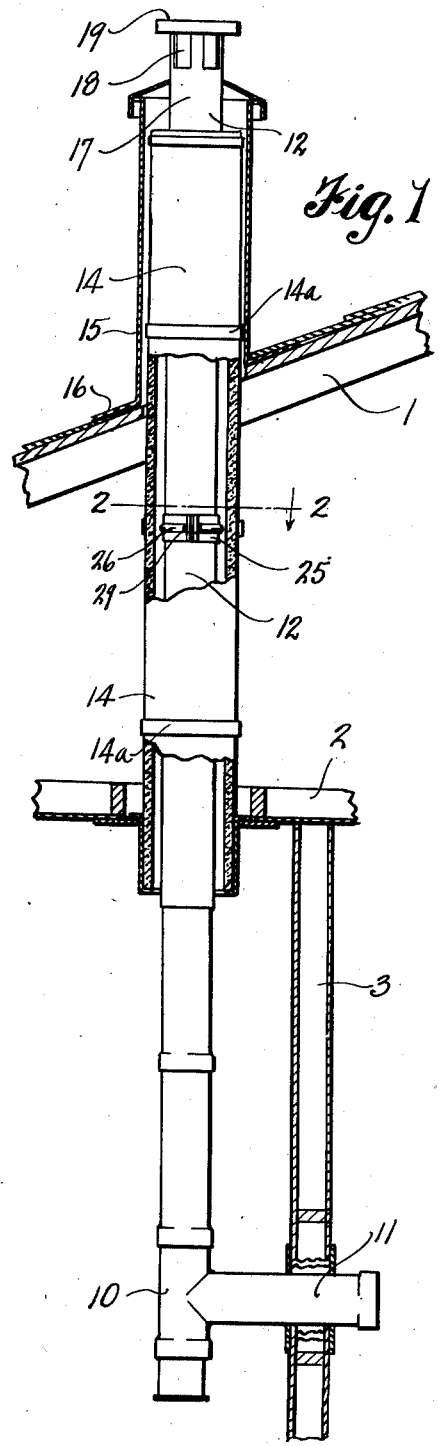
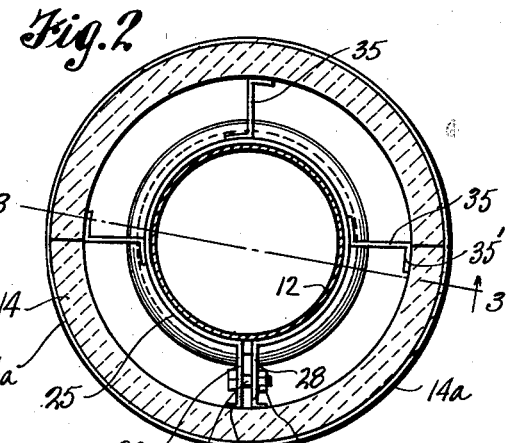
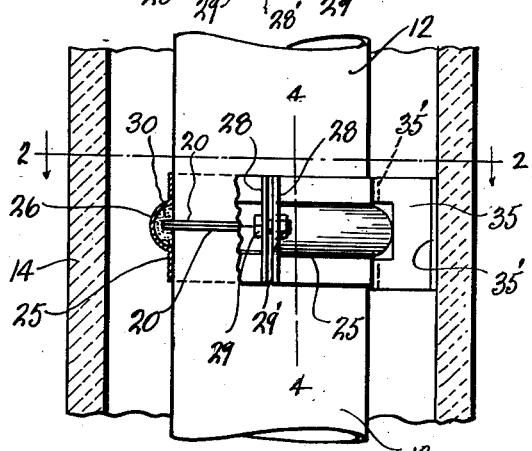
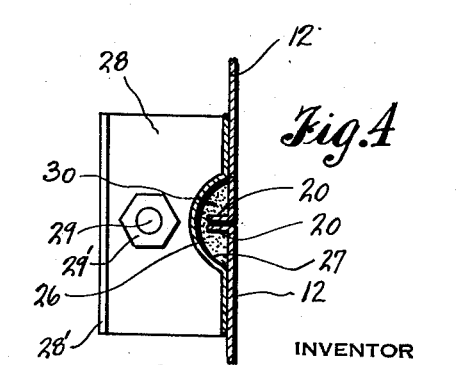
INVENTOR
ALFRED H. JAHNS
BY
Cook & Robinson
ATTORNEYS Patented Nov. 14, 1944

2,362,557

UNITED STATES PATENT OFFICE 2,362,557

PIPE CONNECTION

Alfred H. Jahns, Seattle, Wash.

Application February 1, 1943, Serial No. 474,299

2 Claims. (Cl. 285—22)

This invention relates to pipe joints or connections, and it has reference more particularly to the provision of means for connecting lengths of pipe in end to end relationship, such for example, a type of joint, or connection that is especially desirable for the joining of pipe sections to form a chimney flue.

It is the principal object of this invention to provide means whereby pipe sections, and especially pipe sections that are porcelain enameled, may be quickly, economically, and satisfactorily joined in a tightly sealed connection.

More specifically described, the present invention has to do with the provision of a pipe joint wherein the ends of pipe sections that are to be joined together are each formed with an outturned peripheral flange, and a clamping band or collar of special form is applied about the pipe sections and over the flanges, and is then drawn tight to enclose the flanges in a manner whereby to retain the sections functionally assembled and the joint tightly sealed; the tightening of the band, in this instance, operating to draw the flanges tightly into abutment and into concentric registration with each other.

Another object of this invention is to provide a connection that is especially desirable for the joining of lengths of enameled pipe, and which connection while gas tight will permit of a certain degree of flexibility in the connection.

Still other objects of the invention reside in the details of construction of the various parts used in the combination and in their relationship in the completed joint.

In accomplishing these, and other objects of the invention, I have provided the improved details of construction, the preferred forms of which are illustrated in the accompanying drawing, wherein—

Fig. 1 is a sectional detail showing part of a building structure, equipped with a flue that includes pipe sections that are joined in accordance with and by means embodying the present invention.

Fig. 2 is an enlarged cross section, taken on the line 2—2 in Fig. 1 and in Fig. 3.

Fig. 3 is a horizontal section taken on the line 3—3 in Fig. 2.

Fig. 4 is an enlarged cross sectional view of the joint, as seen on line 4—4 in Fig. 3.

Referring more in detail to the drawing—

For the purpose of illustrating a structure in which the present type of joint is especially applicable, I have shown a portion of a building having a roof portion designated by reference numeral 1, a ceiling 2, and a partition 3. Extended vertically through the ceiling and roof is a flue comprising a succession of short lengths of pipe in end to end connection. At the lower end of the flue is a pipe section 10 which has a horizontal pipe 11 extended therefrom, and passing through the partition wall for connection with the flue of a stove or furnace not here shown, and those particular sections making up that portion of the flue below the ceiling have bell and spigot ends fitted one within the other, while those sections 12 that form that part of the flue that is above the ceiling are joined end to end in accordance with the objects of this invention, and as shown in Figs. 2, 3 and 4, presently to be described in detail.

The upper portion of the flue formed by the pipe sections 12, is housed within a tubular sleeve 14, made up of segmental lengths of asbestos, or other suitable insulation, held together by bands 14a. The sleeve 14 extends from slightly below the ceiling, through the ceiling and roof, and somewhat above the latter. That part of the flue and sleeve that extends above the roof is enclosed in a metal sleeve or false chimney 15, equipped at its lower end with a plate 16 that is fixed to the roof, and at its upper end, mounts a cap 17, which is fitted closely about the upper flue section 12. The flue extends beyond the upper end of the sleeve 15, and has lateral outlets 18, and is covered by a cap 19.

Without going further into detail with respect to the general details of construction of the flue, it will be stated that such may be advantageously constructed of porcelain enameled galvanized iron. However, when such tubing is used, it is required that due consideration be given to the type of means used to connect the sections together to insure a satisfactory joint and to avoid chipping the enamel. The present joint, preferably, is made as follows: the ends of each pipe section 12 are formed with outturned, peripheral flanges 20, and when the lengths of pipe are assembled in a flue, these flanges are brought concentrically into registering abutment as shown in Fig. 3 or 4. Then a split clamp collar 25, preferably of metal, is fitted about the flue to overlap the ends of adjacent sections across the joint. The collar 25 as shown best in Fig. 4, is formed with a continuous, circumferential bead 26, pressed outwardly from the collar, thereby defining an inwardly opening channel 27 in which the abutted flanges of adjoined sections are contained with substantial clearance as observed in Fig. 4. The ends of the collar 25 terminate in outturned wings 28, and a clamp bolt 29 is extended through the wings as shown. Upon tightening the bolt nut 29', the band will be drawn tight about the flue sections to hold them functionally assembled.

To better seal the joint, and to permit a slight amount of flexibility in the connection, I prefer to fill the channel 27 with a packing 30 of asbestos, or the like, as seen in Fig. 4. Such a clamp collar may be made in one or more segments, as found most desirable, and if the flue is to be confined in an insulating sleeve 14, or the like, as in Fig. 1, suitable metal spacers 35 may be applied between the clamp band and sleeve.

As seen in Fig. 2, the spacers 35 are radially disposed metal strips and have oppositely turned flanges 35' at their opposite ends, one of which flanges is welded or otherwise fixed to the collar 25, and the other flange engages the inside surface of the insulating sleeve. Also, the wings 28 of the clamp collar may be flanged at their ends, as at 28' on Fig. 2, to engage the sleeve to serve as spacers.

While I have illustrated and described the present type of connecting joint as applied to a chimney or flue, it is to be understood that I do not desire to restrict the invention thereto, but intend that it shall be applied to pipe connections wherever such type of joint can be used to advantage. It is explained, however, that such a type of connection is especially desirable where pipe sections are enameled, and therefore can not be connected together by means which would ordinarily cause breaking or chipping of the enamel.

This type of connecting joint may be applied to pipes of various diameters, it permits quick and easy assembly of pipe sections, and provides a joint that will remain airtight and secure yet flexible to a certain extent.

Having thus described my invention, what I claim as new therein and desire to secure by Letters Patent is:

1. In combination, a flue comprising pipe sections of like diameter, in end to end relationship and an insulating sleeve of larger diameter enclosing the flue, each section of the flue having an integral peripheral flange at its end, outturned therefrom at a right angle, and said flanges of adjacent sections being in registering abutment, a split collar applied tightly about the sections across the joint, and formed at its ends with out-turned wings, and a clamping bolt applied through said wings to tighten and hold the collar about the sections; said collar having a continuous, outwardly formed bead therein providing an inwardly opening channel confining the flanges therein with substantial clearance, and a resilient fireproof packing filling the channel about the joint and spacers between the flue sections and sleeve.

2. In combination, a flue comprising pipe sections in end to end abutment, and an insulating sleeve surrounding the flue with clearance between them; said pipe sections being formed at their ends with out-turned peripheral flanges, a clamp collar applied about adjoining sections across the joint, and confining the flanges therein, and spacers fixed to the collar and engaging the walls of the sleeve to hold the flue centered therein.

ALFRED H. JAHNS.